United States Patent
Storm

(10) Patent No.: US 8,564,678 B2
(45) Date of Patent: *Oct. 22, 2013

(54) COMMUNICATION SYSTEM INCLUDING A PORTABLE DEVICE FOR CAPTURING IMAGES AND COMPARING THE IMAGES TO A DATABASE OF CHARACTERISTICS

(76) Inventor: Mason Ricardo Storm, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/195,982

(22) Filed: Aug. 21, 2008

(65) Prior Publication Data

US 2009/0079838 A1 Mar. 26, 2009

Related U.S. Application Data

(62) Division of application No. 10/483,626, filed as application No. PCT/GB02/03245 on Jul. 17, 2002, now Pat. No. 7,432,978.

(30) Foreign Application Priority Data

Jul. 17, 2001 (GB) .................................. 0117418.4
Aug. 21, 2001 (GB) .................................. 0120260.5
Jan. 30, 2002 (GB) .................................. 0202035.2

(51) Int. Cl.
*H04N 5/232* (2006.01)
*H04N 7/18* (2006.01)
*H04N 5/225* (2006.01)
*G06K 9/00* (2006.01)

(52) U.S. Cl.
USPC .......... 348/211.2; 348/78; 348/159; 348/376; 382/115

(58) Field of Classification Search
USPC ............................................. 348/77, 78, 159
See application file for complete search history.

(56) References Cited

U.S. PATENT DOCUMENTS

| 4,097,893 | A | | 6/1978 | Camras | |
|---|---|---|---|---|---|
| 5,222,152 | A | * | 6/1993 | Fishbine et al. | 382/127 |
| 5,305,033 | A | | 4/1994 | Takahashi et al. | |
| 5,406,324 | A | * | 4/1995 | Roth | 348/22 |
| 5,467,403 | A | | 11/1995 | Fishbine et al. | |

(Continued)

FOREIGN PATENT DOCUMENTS

| GB | 2 252 836 A | 8/1992 |
|---|---|---|
| JP | 05128902 A | 5/1993 |

(Continued)

OTHER PUBLICATIONS

Dees, Tim; "IACP 2000 Product Report"; Feb. 2001, Law & Order, Wilmette; vol. 49, Iss. 2, p. 44.

*Primary Examiner* — John Villecco
(74) *Attorney, Agent, or Firm* — Browdy and Neimark, PLLC

(57) ABSTRACT

A torch casing 10 with a reflector 46 and a bulb 44 incorporates camera 48 50 52 taking pictures through front face 64 and employs flash tube 58 behind the camera chip 50 reflecting off reflector 46 and reflected onto reflector 46 by mirrored surface 60 on the back of camera chip 50. Captured images, still or video, are exported by radio frequency unit 22 to, for example, secure and supervised store 124. Ultraviolet unit 65 causes fluorescence which is photographed by camera 48 50 52. Display screen 70 shows camera 48 50 52 images or received images. The apparatus continuously sends its position determined by GPS navigation. Sounds can be recorded, sent and received. Iris patterns and fingerprints can be recognized from an updated store.

31 Claims, 5 Drawing Sheets

(56) References Cited

U.S. PATENT DOCUMENTS

| | | | |
|---|---|---|---|
| 5,594,498 A | 1/1997 | Fraley | |
| 5,793,419 A | 8/1998 | Fraley | |
| 6,037,977 A | 3/2000 | Peterson | |
| 6,038,295 A * | 3/2000 | Mattes | 379/93.25 |
| 6,084,510 A | 7/2000 | Lemelson et al. | |
| 6,111,977 A | 8/2000 | Scott et al. | |
| 6,196,702 B1 | 3/2001 | Krietzman | |
| 6,232,298 B1 * | 5/2001 | von Borstel et al. | 514/49 |
| 6,262,764 B1 | 7/2001 | Perterson | |
| 6,317,544 B1 * | 11/2001 | Diehl et al. | 385/115 |
| 6,320,974 B1 * | 11/2001 | Glaze et al. | 382/115 |
| 6,433,818 B1 | 8/2002 | Steinberg et al. | |
| 6,518,881 B2 | 2/2003 | Monr | |
| 6,532,298 B1 * | 3/2003 | Cambier et al. | 382/117 |
| 6,563,532 B1 * | 5/2003 | Strub et al. | 348/158 |
| 6,668,134 B1 * | 12/2003 | Niikawa | 386/235 |
| 6,747,692 B2 | 6/2004 | Patel et al. | |
| 6,749,316 B2 | 6/2004 | Wong et al. | |
| 6,784,833 B1 * | 8/2004 | Evans | 342/357.14 |
| 6,860,611 B2 | 3/2005 | Gentz | |
| 6,877,878 B2 | 4/2005 | Raskas | |
| 6,970,183 B1 * | 11/2005 | Monroe | 348/143 |
| 6,995,668 B2 | 2/2006 | Junqua | |
| 7,086,749 B1 | 8/2006 | Hanley | |
| 7,306,348 B2 | 12/2007 | Quittner | |
| 7,412,604 B1 * | 8/2008 | Doyle | 713/186 |
| 7,505,610 B2 * | 3/2009 | Milne et al. | 382/116 |
| 2001/0022621 A1 * | 9/2001 | Squibbs | 348/232 |
| 2002/0150282 A1 * | 10/2002 | Kinsella | 382/124 |
| 2003/0025599 A1 | 2/2003 | Monroe | 340/531 |
| 2003/0161507 A1 * | 8/2003 | Lawandy | 382/118 |
| 2006/0028811 A1 | 2/2006 | Ross et al. | |
| 2006/0104483 A1 * | 5/2006 | Harel et al. | 382/115 |
| 2006/0125918 A1 | 6/2006 | Sutton | |
| 2006/0171700 A1 | 8/2006 | Yang et al. | |
| 2009/0175507 A1 * | 7/2009 | Schaffner | 382/117 |

FOREIGN PATENT DOCUMENTS

| | | |
|---|---|---|
| JP | 2001008137 A * | 1/2001 |
| KR | 2004058381 A | 7/2004 |
| WO | WO 9319433 A | 9/1993 |
| WO | WO 01/11581 A1 | 2/2001 |

* cited by examiner

COMMUNICATION SYSTEM INCLUDING A PORTABLE DEVICE FOR CAPTURING IMAGES AND COMPARING THE IMAGES TO A DATABASE OF CHARACTERISTICS

CROSS REFERENCE TO RELATED APPLICATION

This is a division of copending parent application Ser. No. 10/483,626, filed Jun. 29, 2004, which is a 371 of PCT/GB02/03245 filed Jul. 17, 2002, the contents of both of which are incorporated herein by reference.

FIELD

The present invention relates to portable equipment of the type carried by police, security personnel or military personnel.

BACKGROUND

Police, military and security services are all provided with items they are expected to carry about their person while going about their duties. Particularly in the case of police and security companies, incidents occur which require evidence to be submitted. The present invention seeks to provide an additional capacity for recording visual and audio evidence without adding to the number or bulk of items expected to be carried by the individual.

Recorded, visual or audio evidence must be shown to have been free of tampering or alteration if it is to be accepted in a court of law. The present invention seeks to provide a system where recorded sounds or images can be shown not to have been the subject of alteration or tampering.

In the ordinary way of things, to provide the additional capacities that the present invention seeks to provide, extra equipment would have to be carried by the individual. The present invention seeks to provide that extra ability within the compass of items already carried by the individual.

SUMMARY

According to a first aspect, the present invention consists in a portable apparatus comprising; a torch, said torch comprising a transparent front face; illumination means for providing illumination through said front face; camera means, contained within said torch and selectably operable to capture images through said front face; and export means, operative to export images, captured by said camera means, to a remote recipient.

According to a second aspect, the present invention consists in a method for capturing images, comprising the steps of; providing a torch comprising a transparent front face; providing illumination, through said front face by employing illumination means; capturing visual images by employing camera means, contained within said torch and selectably operable to capture images through said front face; and exporting captured images by employing export means, operative to export images, captured by said camera means, to a remote recipient.

The present invention further provides that the torch can comprise a bulb and a reflector, and that the camera can comprise an optical portion, looking out through the front face, the optical portion being mounted in front of the bulb.

The present invention also provides that the camera can comprise a flash unit, the flash unit being operative to provide light from a point between the camera and the bulb, the reflector directing light from the flash unit in a forward direction.

The present invention further provides that the face of the optical unit towards the bulb can comprise a reflective surface to direct light from the flash unit and light from the bulb onto the reflector.

The present invention further provides for the provision of ultraviolet illumination to render fluorescent materials visible for imaging in visible light.

The present invention also provides an audio recorder for capturing sounds for export along with the images.

The present invention also provides that the images obtained by the camera can be downloaded to a secure memory with supervised access.

The present invention further provides that the downloading to the secure memory can be via a radio link, and that the radio link can be through a cellular telephone network, a direct radio link, or through a satellite.

The invention further provides that the cellular telephone network can be any network capable of effecting image and audio data transfer.

The present invention further provides that the means for downloading can contain an intermediate station, and that the intermediate station can be a motorised vehicle.

The present invention also provides for the use of a viewing screen, the viewing screen being capable of either or both of receiving images to be viewed by the radio link, and viewing images captured by the camera unit.

The present invention further provides for a satellite beacon operative to indicate its location at all times.

The present invention further provides for automatic recognition of human identification characteristics, such as iris patterns or fingerprints, from a captured image.

The present invention is further explained, by way of example, by the following description taken in conjunction with the appended drawings in which:

DETAILED DESCRIPTION

Figure 1:
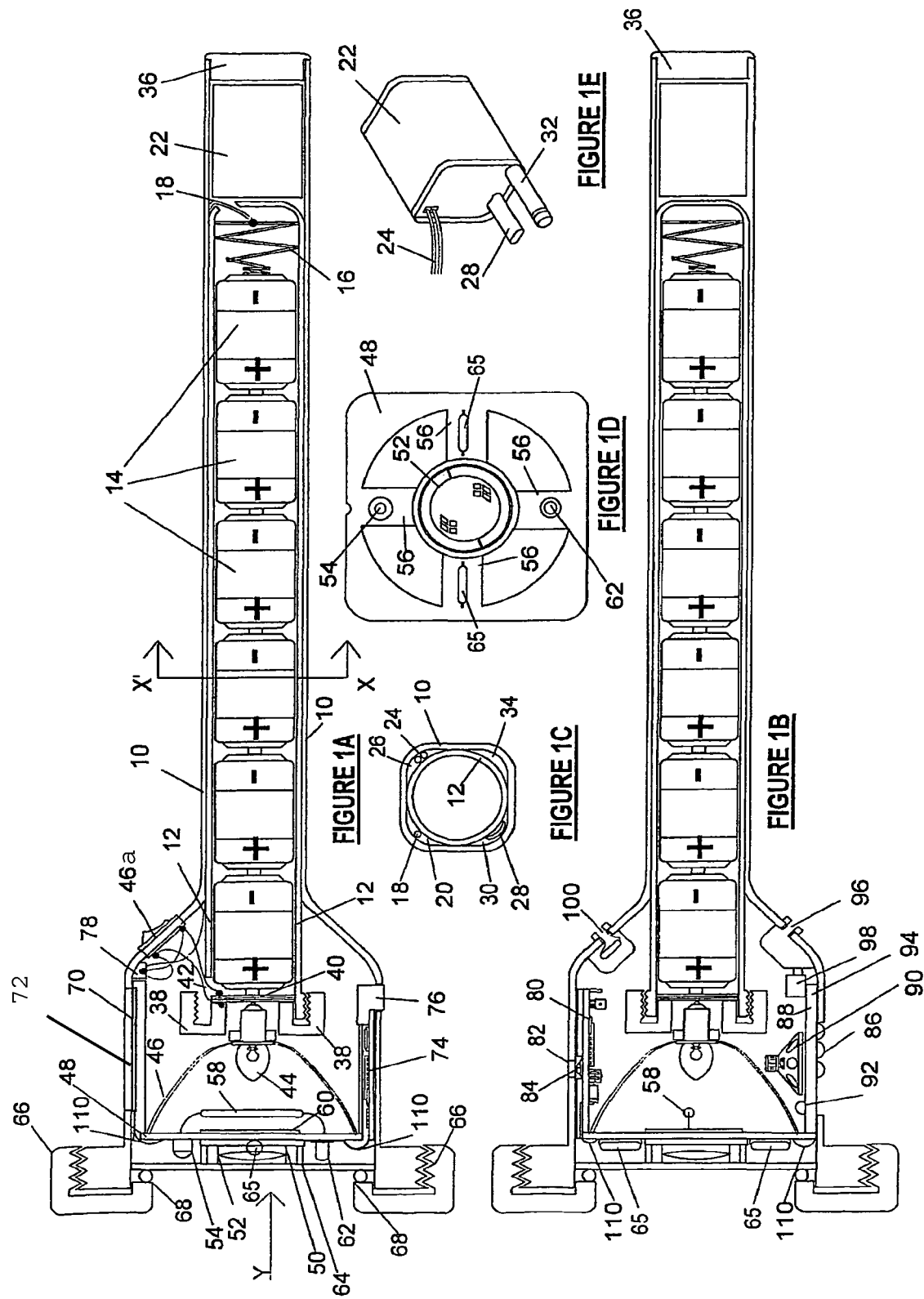
FIG. 1A shows a cross-sectional view, from the side, of a torch camera according to the present invention.
FIG. 1B shows a cross-sectional view, from above, of the torch camera of FIG. 1A.
FIG. 1C shows a cross-sectional view of the handle section of the torch camera, cut as indicated by the line X X' and looking in the direction of the arrows (in FIG. 1A).
FIG. 1D shows a face-on view of the camera plate in the torch camera, looking in the direction of arrow Y in FIG. 1A.
FIG. 1E is an isometric view of the radio frequency unit of the torch camera FIGS. 1A and 1B.

Attention is first drawn to FIGS. 1A to 1E, which together show one possible mechanical construction for the torch camera. FIG. 1A shows a cross-sectional side view of the torch camera.

The torch camera 11 comprises a torch casing 10 of generally square cross-section encompasses a cylindrical battery tube 12 containing sufficient cells 14, in series, to form a battery of cells to power the torch camera 11. A pressure spring 16, forced against the negative casing of the cell 14 furthest from the front of the torch camera 11, has a negative wire 18 electrically affixed thereto. The negative wire 18 passes through battery tube 12 wall and along a first void 20 between the inside of the torch casing 10 and the outside of the battery tube 12 so passing energy from the negative terminal of the battery of cells towards the front of the torch camera 11. The torch casing 10, behind the battery tube 12, accommodates a radio frequency unit 22 which provides communications for the torch camera 11. The radio frequency unit 22 is powered by radio frequency unit power cables 24 which pass from the front of the torch camera 11, to the radio frequency unit 22, through a second void 26 between the inner surface of the torch casing 10 and the outer surface of the battery tube 12. The radio frequency unit 22 is bi-directional. Signals received from the radio frequency unit 22, and signals sent to the radio frequency unit 22 are provided on a data cable 28 which passes to and from the front of the torch camera 11 in a third void 30 between the inner surface of the torch casing 10 and the outer surface of the battery tube 12. Radio signals are sent from, and received by the radio frequency unit 22 by means of an antenna 32. When the radio frequency unit 22 is present in the torch camera 11, the antenna 32 is accommodated at the distal (furthest from the front) end of a fourth void 34 between the inner surface of the torch casing 10 and the outer surface of the battery tube 12. A simple conformal bung 36 holds the radio frequency unit 22 within the distal end of the torch casing 10 and provides the possibility of provision of signal connections, to the radio frequency unit 22, there through by means of connectors, plugs or sockets (not shown).

The cells 14 are held, in the battery tube 12, against the pressure of the spring 16, by means of a screw retainer 38 which screws onto the end of the battery tube 12 to force a connecting plate 40 against the end of the endmost cell 14. The connecting plate 40 is, typically, a piece of double sided printed circuit board cut to fit within the head of the battery tube 12. A slot void 42 permits access of wires to the connecting plate 40. A protrusion is provided on the connecting plate 42 which fits into the slot void to prevent rotation of the connecting plate 40 within the battery tube 12. One wire is soldered to the face of the connecting plate 40 closest to the endmost cell 14. This wire provides a constant 9-volt supply. Another wire is soldered to the face of the connecting plate 40 away from the endmost cell 14. One terminal of the bulb 44 touches that face when the torch camera 11 is assembled. A switch 46a can be operated to connect the two faces of the connecting plate 40 together, thus lighting the bulb 44 which is grounded to the negative wire 18 via a metallic parabolic reflector 46.

The parabolic reflector 46 is situated behind a camera plate 48 which carries a charge coupled device (CCD) camera chip 50 beneath a pre-adjusted lens assembly 52. The camera chip 50 can be suitable to capture monochrome or colour images, and as single or continuous images, depending upon the selected mode of operation of the camera torch 11.

In the preferred embodiment of the torch camera 11, the camera plate 48 suspends the lens assembly 52 on struts 56 in the centre of the field of the reflector 46. This example shows four struts 56. It is to be understood that the invention also encompasses embodiments with one strut 56, two struts 56, three struts 56, or more than four struts 56. The invention also encompasses embodiments with no struts, where the lens assembly is glued or otherwise affixed onto a surface of or within a void in a transparent plate.

Light from the bulb 44, and from a flash tube 58, can pass around the struts 56. A mirrored surface 60 is provided on the rear of the camera plate 48 beneath the camera chip 50 to reflect light from the flash tube 58 and the bulb 44, which would be otherwise obstructed by the camera chip 50 and lens assembly 52 back onto the reflector 46 to be sent around the struts 56. Approximately half of the light from the flash tube 58 is reflected out of the torch camera 11 directly from the parabolic reflector 46. The remainder is reflected from the mirrored surface 60, onto the parabolic reflector 46, and thence out of the torch camera 11.

A low power, visible light, laser diode 54, mounted on one of the struts 56, is operative to send a straight beam of light which can be used as an aiming device when pointing the torch camera 11 at a target to acquire images. A photo sensor 62 is employed to determine the amount of exposure required when acquiring an image. The photo sensor 62 can be omitted if the camera chip is employed for the same purpose. One or more ultraviolet emission tubes 65 provide ultraviolet illumination to render visible fluorescent substances, such as fingerprints, enabling them to be observed and photographed. A transparent front plate 64 is held within the end of the torch casing 10 by a screw-on circular flange 66 made water and moisture tight by a sealing ring 68. A display screen 70, for preference a low power liquid crystal device displaying at a pixel density in the region of twenty five dots per centimetre or greater, is visible through a first transparent section 72 of the torch casing 10. A controller 74 commands and maintains the function of the communication and data reception and dissemination process. A data transfer socket 76 allows images or records of sound signals to be sent to or obtained from an external source such as a computer. A power plug 78 permits the end of that portion of the camera supporting the display screen 70 to plug the camera into the battery of cells 14 as the torch camera is assembled. This powers the entire camera. The power plug 78 also allows the torch camera 11 to be taken apart.

A flash tube power generator 80 generates the high voltages and electric charges necessary to operate the flash tube 58 and the ultraviolet emission tubes 65. The flash tube power generator 80 is, for preference, maintained as a separate entity because of the risk of the high voltages and charges damaging sensitive low voltage semiconductor devices. The generator 80 can work by charge pumping voltage multiplication, by high frequency magnetic inversion, or by a combination of both. A second transparent section 82 in the torch casing 10 permits visibility of a neon charge indicator 84 which shows that the camera has accumulated enough flash energy to take a picture using the flash tube 58. The ultraviolet emission tubes 65 can be operated continuously for human observation, or in a flash or continuous mode for photography.

A plurality of control buttons 86 allow the user to control the torch camera 11. The control buttons 86 can be directly acting (directly causing a function) and/or can be interactive the controller 74 by means of messages or icons on the display screen 70 to provide menu based control.

A solid state audio recorder 88, incorporating a miniature loudspeaker 90 and microphone 92 allows, for preference, up to 20 minutes of sound recording. Where space permits, a recorder employing a removable tape can, instead, be used. The control button board 94 also comprises a plus 98 which engages an earphone socket 96 allowing recordings to be replayed.

A battery charger socket 100 allows for recharging of the cells 14 without the necessity of their removal or replacement.

Not shown, but implicit, is a battery charging unit, for used from electric mains or from an automotive electric system, operative to control the flow of current to safe limits and to terminate charging when charging is complete.

Figure 2:
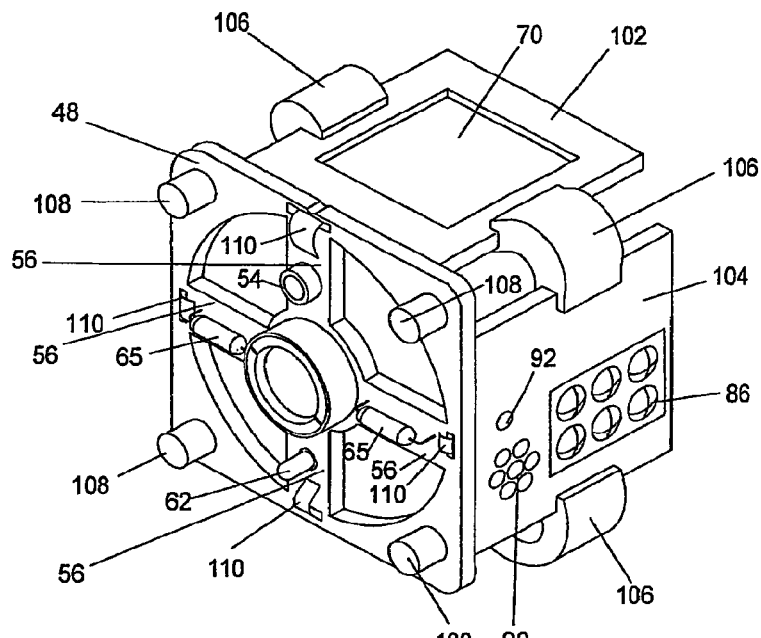
FIG. 2 is an isometric view of the camera and audio elements of the torch camera, otherwise shown in FIG. 1D.

Attention is next drawn to FIG. 2, showing an isometric view of the assembly of camera and audio elements removed from the torch casing 10. The assembly effectively forms five sides of a "camera cuboid", at least one axis of which has a substantially square cross section.

The display screen 70, on a display screen board 102 forms, one side of the cuboid. A control button board 104 forms a second face of the cuboid. Not visible in FIG. 2 are a controller board which supports the controller 74 and flash tube power generator board which supports the flash tube power generator 80, which two entities form another two sides of the cuboid. The camera plate 48 forms the front face of the cuboid. The parabolic reflector 46 with the bulb 44 installed therein lies within the camera cuboid, behind the camera plate 48. The rear face of the cuboid is vacant. Supporting clips 106 are placed between the boards 102, 104 to provide rigidity and strength. The entire camera cuboid plugs in to, and is removable from, the torch casing. Resilient pads 108, on the front of the camera plate 48, maintain the spacing between the camera plate 48 and the front plate 64 such that when the sealing ring 68 is screwed down, a firm and cushioning pressure is obtained. Flexible printed circuit boards 110 allow for electrical connection between the various boards 104, 102, 48 of the camera cuboid. The struts 56 and the residue of the front plate 48 act as a power and signal highway for the operation of the torch camera 11. The rear surfaces of the struts 56 are also used for power and signal conduction. The boards 102 104 48 can be multi-layer printed circuit boards.

It is to be appreciated that this is just one preferred way in which the torch camera 11 can be implemented. The present invention also encompasses that the cuboid can be replaced with a cylindrical mount for all the elements present behind the camera plate 48. The present invention also encompasses all those embodiments which allow the components to be held within a torch casing, of this form, or of any other form, using this style or any other style of battery or power unit.

Figure 3:
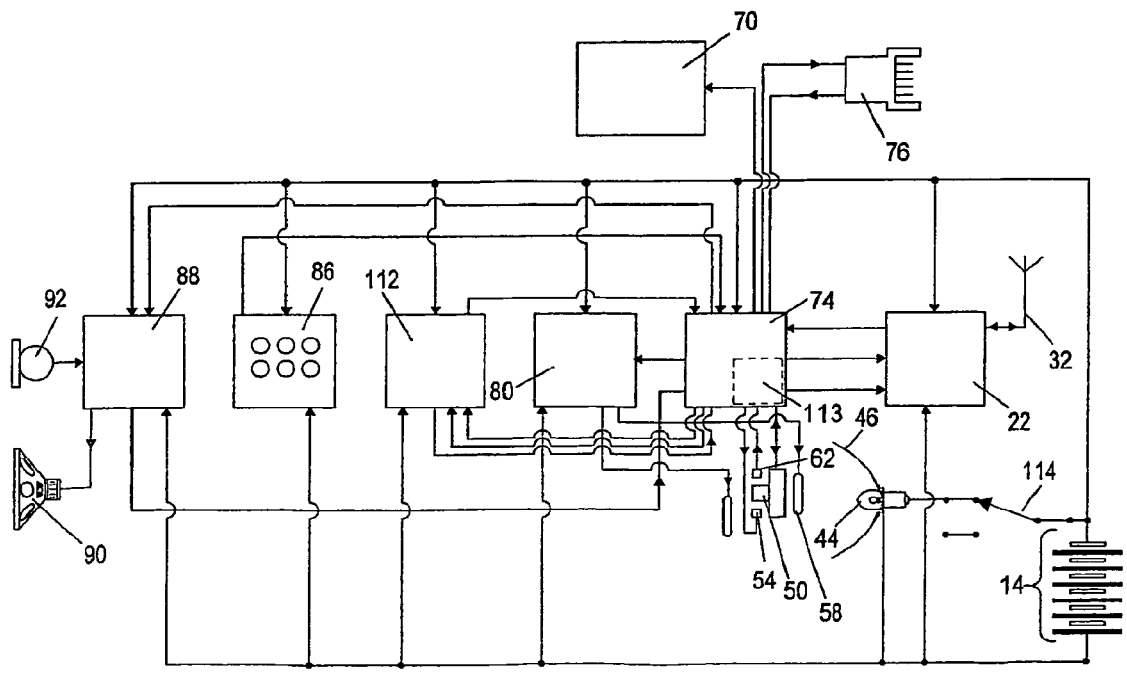
FIG. 3 is a schematic block diagram of the torch camera.

FIG. 3 shows a schematic block diagram of the torch camera 11. The controller 74 sends commands and control signals to the camera chip 50 and receives image signals in return. The controller 74 can instruct the laser diode 54 to shine and can respond, for the purpose of controlling the acquiring of an image, to the output of the photo sensor 62. The controller 74 also controls the flash tube power generator 80 to command it when to trigger the flash tube 58 or to power the ultraviolet emission tubes 65. A memory 112 is coupled to receive image signals from the controller 74, to receive commands from the controller 74, and to provide image signals to the controller 74 for viewing on the display screen 70, or transmission from the torch camera 11 via the data transfer socket 76 or the radio frequency unit 22. The control buttons 86, operated by the user, send instructions to the controller 74 which, in response, controls all of the elements in the camera cuboid. The voice recorder 88 sends signals to the controller 74 which the controller can then store in the memory 112 or immediately externalise. In its turn, the controller 74 can cause signals to be transferred to be heard through the earphone socket 96 or the miniature loudspeaker 90.

Housed within the controller 74, or at least connected to and in communication with the controller 74, is a recognition unit 113 which can be used for recognition, from captured images, of human identification characteristics, such as the pattern of the iris of the eye, or fingerprints. A library of known characteristics is compared with the characteristic of the captured image and a match, or closest match is found. The library can be received via the radio frequency unit, received via the data transfer socket, can be stored in a memory, stored n a removable card, or any combination of these. The captured image can be sent to a remote location 700 for comparison, using a comparator 123, against a greater database 125 of characteristics, and a report sent back and displayed. When capturing an image of a human iris, the flash tube power generator can be set to a low power mode to avoid visual damage. Alternatively, light from the bulb 44 can be employed. A relay or solid state switch can be employed to allow the controller 74 to control the illumination of the bulb 44.

The battery of cells 14 is connected to the bulb 44 via a switch 114. The bulb 44 can thus be switched on or off. The camera cuboid, if present in the torch camera 11, is permanently connected to the battery of cells 14 so that the memory 112 does not lose a record of images or sounds stored therein. The control buttons 86 are able to switch the camera cuboid into a quiescent state wherein the memory 112 can sustain its records using the power in the battery of cells 14 for many months, provided the bulb 44 is not substantially used before recharging.

The controller 74 can send data (sound or images) for export via the radio frequency unit 22 or the data transfer socket 76 or can import data (sound, images or text) therefrom. Imported data can then be displayed on the display screen or played through the miniature loudspeaker 90 or the earphone socket 96. Equally, images captured by the camera chip 50 can be recovered from the memory 112 and displayed on the display screen 70. The same is true for sounds as for images. Sounds can be imported and played through the miniature loudspeaker 90 or through the earphone socket 96.

Figure 4:
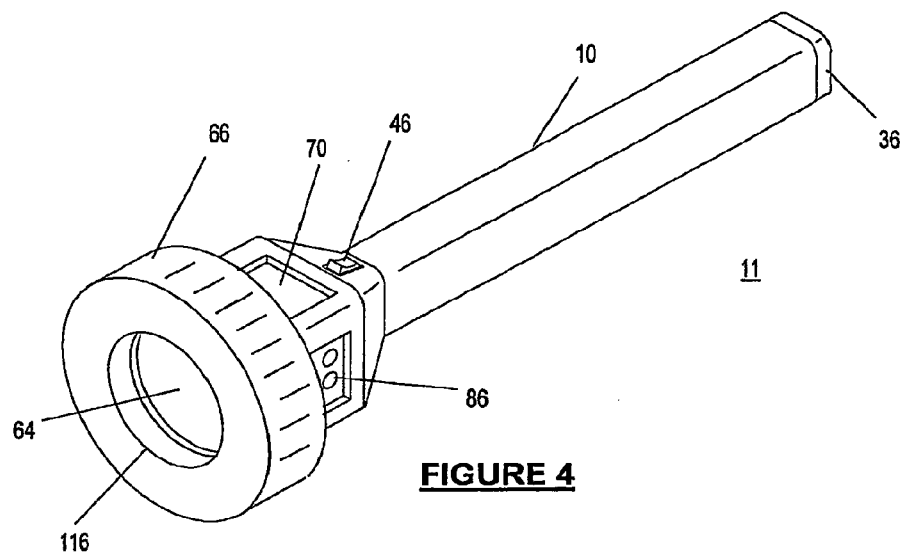
FIG. 4 is an isometric view of the complete torch camera.

Attention is drawn to FIG. 4 showing an isometric view of the torch camera 11. The generally square outline of the main body of the torch camera 11 is clear, together with the circular outline of the flange 66 which tightens down the front plate 64, leaving a circular aperture 116 of substantially the same diameter as the mouth of the parabolic reflector 46. It is preferred that the torch casing 10 and the battery tube 12 are made of a plastic non-conducting material so that the antenna 32 of the radio frequency unit 22 may be free to radiate. If metallic material is used, the present invention permits that the antenna 32 can be external to the torch casing 10. The embodiment of the invention shown can be implemented in other forms of case and with different types of battery. The embodiment shown is preferred since it is of substantially the same dimensions and outline as a standard torch as issued to police, security services, night watchmen, firemen, military personnel and utility company employees. As such it simply replaces the ordinary torch in the utility belt and thus maintains the weight, volume and form of equipment carried. If it is not desired to use the camera cuboid, so that a simple torch is obtained, it is simply achieved by removing the cuboid camera by unscrewing the flange 66, unplugging the camera cuboid and putting it aside. The parabolic reflector 46 and its bulb 44 are retained and the space taken up by the camera plate 48 and resilient pads 108 replaced by a simple washer of the same thickness. The radio frequency unit 22 can, similarly, be removed. The torch camera 11 thus offers the options of being a simple torch, a torch with camera facilities, or a torch with camera and radio facilities or in any configuration as a sealed unit.

The camera torch 11 can operate in various modes. At night, both the flash tube 58, and/or the ultraviolet emission tubes 65, and/or the bulb 44 may be used to illuminate the object photographed. In lighter conditions, the picture may be taken using none of these. The display screen 70 may be used to display the image seen by the camera chip 50 before the picture is taken. The display screen 70 can also be used to display the status of the camera torch 11 such as the amount of power remaining, the amount of audio recording time remaining, the number of further images which may be taken before downloading, and so on. Equally, the camera torch 11 can receive images via its data transfer socket 76 or via the radio frequency unit 22 to display on the display screen 70.

Figure 5:
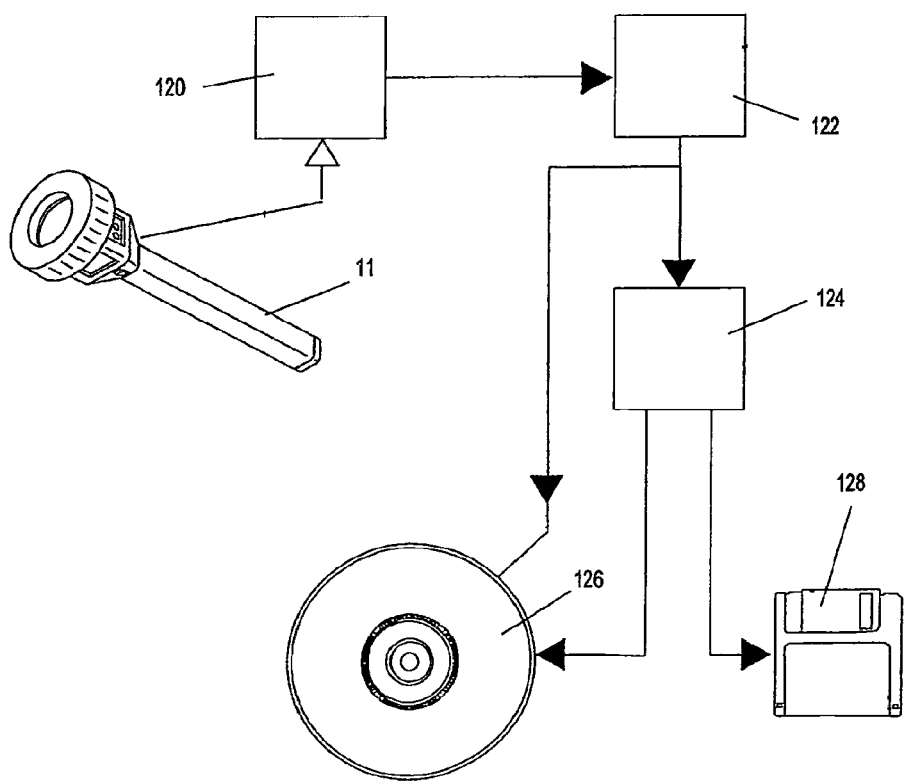
FIG. 5 is a schematic diagram showing how the torch camera can be used for reliable evidence capture.

Attention is next drawn to FIG. 5, showing one way in which the camera torch 11 can be used in a situation where evidence must be gathered in such a way that it cannot be the victim of tampering and the authenticity of the evidence and copies is assurable.

The camera torch 11, having acquired sound or image data for transmission, transfers the data to its transmission apparatus 120. The transmission apparatus can be of various kinds, whose nature and possibilities are explained and described with reference to FIG. 6 hereafter. Suffice to say that whatever is given to the transmission apparatus 120 is sent by wire or radio to a receiving station 122 where the signals are decoded and then sent to a secure memory 124 which is under supervision and under controlled access at all times. Once in the secure memory 124, no individual has free access to change or delete any data. As an additional feature, the audio recordings and visual images from the camera torch 11 are date stamped by the camera torch before the camera torch 11 transmits them through the transmission apparatus 120, and this date stamp is recorded in the secure memory 124. The records are further date stamped on reception at the receiving station and on storage in the secure memory 124. As a further precaution, before storage in the secure memory 124, the signals are recorded on a write once recordable compact disc 126 or any removable media of a similar nature. This is a non-volatile method of storage which assures the survival of the records even if the secure memory 124 should fail. A comparison recording may also be made from the secure memory 124. Any copies of the images or sounds can be dispensed from the secure memory 124 on discs 128. The invention also envisages that, as well as use of a write once compact disc 126, there can also be direct photography of the reconstructed image from the receiving station 122 to make a permanent film record against which all other digital records can be compared.

Figure 6:
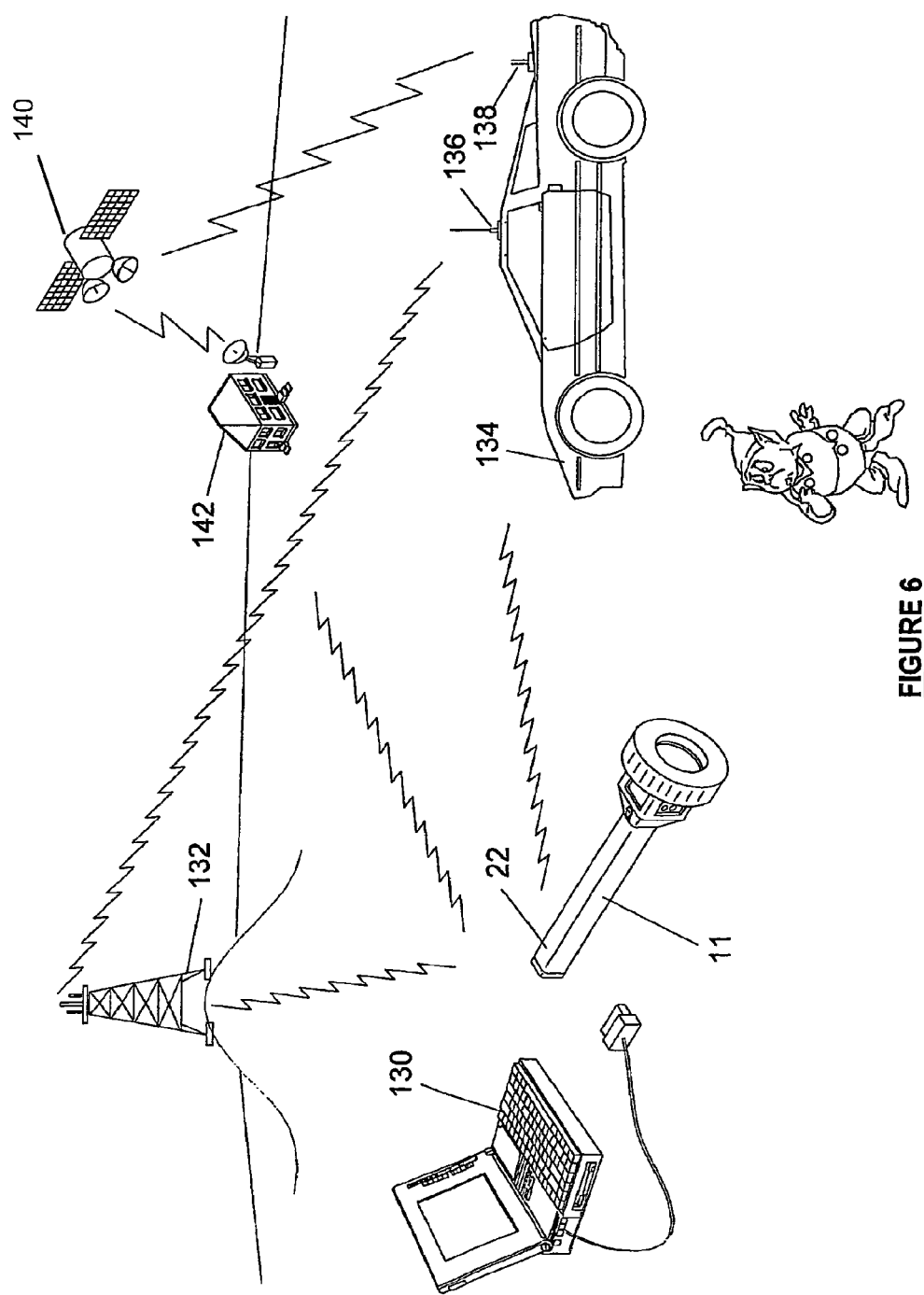
FIG. 6 shows a situation where confirmable evidence capture would be advisable, illustrating the complete communications environment in which the torch camera can be used.
Figure 7:
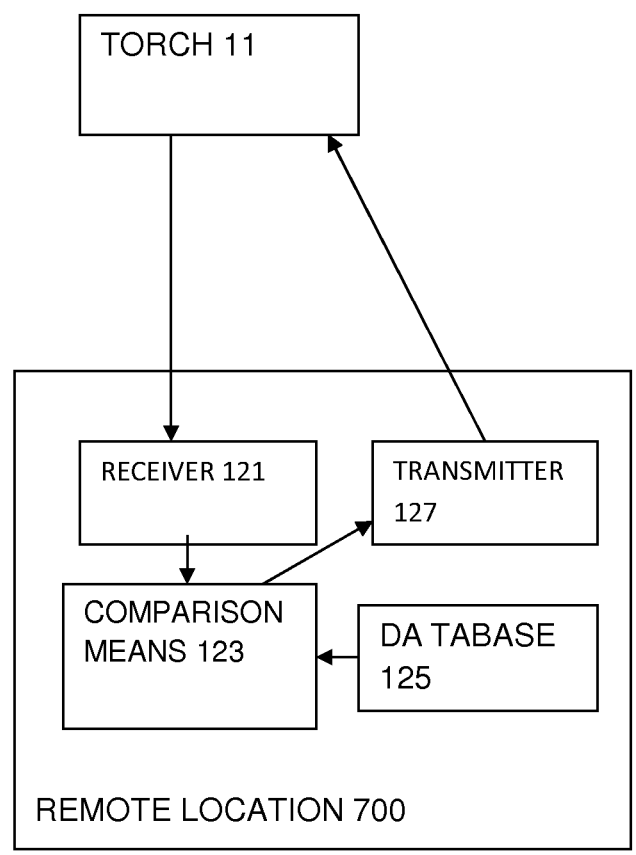
FIG. 7 illustrates a remote location according to the invention.

Finally, FIG. 6 shows the communications environment in which one or more camera torch 118 can function. Simply for the sake of humorous illustration, an incident is depicted to which no credence would be given in the absence of irrefutable evidence.

At the most primitive level, records of images and sounds can be stored in or retrieved from a computer 130. Material, stored directly on the computer 130, is date stamped by the torch camera 11, but this is the only improvement in establishing authenticity over those methods already known for detecting alteration.

The computer 130 can be connected through the Internet to transfer records, or can use any other file transfer system operating by wire, cable, fibre optic cable or radio, or any combination of all three. Such rapid transfer of the records, for example to the receiving station 122, gives a high degree of trust in the authenticity of the records.

The radio frequency unit 22 can communicate directly with a cell phone system 132. The cell phone system 132 can be of any known kind having a capability for data transfer. Not only does the cell phone capability effectively turn the camera torch 11 into a mobile telephone, but it permits direct contact with data recipients or providers without the need for an intermediate computer 130. The types of cellular telephone network 132 can include GPS, EDGE, UMTS and GPRS which is continuously connected in both directions and any such present or future communications system.

The computer 130 can be installed in a road vehicle 134. The road vehicle 134 can contain cell phone apparatus 136 and satellite apparatus 138. The satellite apparatus 138 can send a signal to, or receive a signal from, a communications satellite 140 which can relay it to a receiving point 142 which is a convenient location for the receiving station 122 described with respect to FIG. 5. The radio frequency unit 22 can provide short range communication with the road vehicle 134 which acts as a main and more powerful transmitter/receiver. Equally, the radio frequency unit 22 if strong enough, can communicate directly with the receiving point 142.

The radio frequency unit 22 can combine a plurality of functions. Where a single antenna 32 cannot accommodate all functions, a plurality of antennae are provided.

One additional function for the radio frequency unit 22 is to act as a satellite beacon, whenever not being required to perform other functions, the satellite beacon signal able to be detected and located by a satellite location system in the same way that vehicles can be continuously tracked so that their position is always known. This facility is of importance in finding individuals who may have been the victims of accident, violence or abduction. It also serves as a location marker, and it is a part of this invention that the location of the torch camera 11 can be stored with any record received.

Another additional function of the radio unit 22 is to act as a satellite navigation receiver, whereby the torch camera 11 knows its location on the surface of the earth. The torch camera 11 can display this data on the display screen 70 when required. It is also part of this invention that the torch camera 11 can apply the current GPS reading to any records it sends for storage in addition to any other stamp such as the date stamp. In particular, the torch camera 11 can regularly update a remote facility as to the current position of the torch camera, thereby allowing any user carrying the torch camera 11 or vehicle or aircraft in which the torch camera is installed to be tracked.

The camera torch 118 can take still images, a rapid sequence of still images, or moving images. The images may be continuously downloaded to provide a constantly running record and to avoid the memory 112 becoming too full.

A particularly useful application of the torch camera is in fixed surveillance. The torch camera can be fixedly mounted by means of attachable brackets or screw holes in the case. The torch camera 11 can be trained to regard a selected point in the interior or on the exterior of a building. For example, the torch camera can be trained on a door, or on a window.

The torch camera can be associated with a movement detector. A first type of movement detector can be an ultrasound detector, suitable for use inside a building. The ultrasound detector can be integrated into the torch camera 11, or can be provided as a separate outboard unit. A second type of movement detector can be a PIR (Passive Infra Red) detector which senses the body heat of individuals and animals and the operational heat of mechanical and electrical devices. Though bulky, this too can be integrated into the torch camera 11 or provided as a separate outboard unit. A third type of movement detector can be optical, of a type known with computer surveillance "web cams", where movement is deemed to have occurred if more than a selectable amount of the pixels constituting the instant image has changed within a selectable time, or has changed over a selectably large distance on the instant image. The internal camera on the torch camera 11 can be used for this purpose. It really does not matter what kind of movement detector is employed. It is simply required that movement of individuals is detectable.

The fixedly trained torch camera 11, once movement is detected, takes a fixed (or moving) photograph of the portal or place on which it is trained. The image of the entrant should be present in that photograph. The torch camera 11 can immediately send the photograph to a mediation centre, such as the local police station, or can store the photograph in its memory 112 until the individual has entered or exited the building before transmitting it. The fact of having entered or exited the building can be established by operation of an entry or exit detection device (such as might be found in a burglar alarm), or by simple cessation of movement detection, or any combination of measures.

The mediation centre can take several types of action. It can immediately send the image, and an indication of the origin of the image, to the nearest police or security officer or operative. To this end, the GPS facility, previously described, where the location of a torch camera 11 can be reported, can advantageously be employed both to identify the point of origin of the image and the location of the nearest operative or officer. Alternatively, an address can be caused to accompany the transmission of the photograph to identify the origin of the image. The nearest officer can then look at the image and determine if it is necessary to take action (i.e. it may be an animal, or a known person in the picture). Alternatively, at the mediation centre, a human operative can look at the picture and send it to a nearby officer or operative only if action seems to be necessary. Alternatively, the image can be automatically scanned by computer equipment and the image sent to an officer or operative if action seems necessary.

The fixed torch camera 11 can be used to light a light, which can be its own light or an external light, whenever movement is detected. This light can serve to make the individual visible to the camera, can light the way for the individual, or both.

The pictures, taken by the torch camera 11, can be stored to provided a record of traffic in the region surveyed.

Individuals, carrying a torch camera, and utilising the GPS facility, can transmit a picture of an assailant, the exact location and indication of the exact location of the assault to a nearby police station.

A static torch camera 11, within an area, household or a establishment, also has the potential to receive signals from a pager. A pager can be used as a security device. If a pager sends a predetermined signal to the unit, and the unit identifies that signal, which facility is provided within the controller 74, utility is achieved. For example, if a bank manager is assailed within his bank or house, he can operate his pager (concealed within a pocket or otherwise about his person) to send a predetermined signal to the torch camera 11 which can identify the pager signal and begin, automatically, to send alarm signals indicating the position of the torch camera 11 and the nature of the problem.

A torch camera 11, located within a vehicle, and fitted with movement or intruder sensors, utilising GPS, can provide instant pictures and the vehicle's position to a police station.

If an associated pager is also provided with a GPS facility, a vehicle mounted torch camera 11 can keep local periodic communication with the pager and report, through the greater satellite of cellular telephone system, the position of the pager. If the associated pager does not respond for more than a predetermined period, the vehicle mounted unit will alert the authorities, on the assumption that the owner of the pager is in difficulties, or that the vehicle has been stolen. The authorities can be informed both of the vehicle's present position and state and direction of motion and of the last known position of the pager. If the pager is still within range of the vehicle mounted unit but the owner is not responding, the vehicle mounted unit will continue to report the instant position of the pager. If the vehicle is moved, without the correct response from the pager, a picture of the occupants can be forwarded to all police officers, together with registration, make, colour and other details of the vehicle.

The invention claimed is:

1. A communication system comprising:
    i) a plurality of hand-held mobile communication units, said units comprising a camera means configured to capture an image of a human identification characteristic, and a transmission means for transmitting image data representing said captured image, and including a time and date stamp data associated with said image data, to a secure remote receiving station; and a display for displaying an image obtained by the camera means;
    ii) a receiving means, located at the receiving station, provided to receive image data from at least one of said plurality of hand-held mobile communication units, the image data is time and date stamped upon receipt of the image data at the receiving station;
    iii) an identification means, operative automatically to recognize human identification characteristics from said captured image data;
    iv) an identification memory located at said remote receiving station that is operative to store a plurality of human identification characteristics;
    v) a comparison means is operative to compare the captured image data with each of said plurality of said human identification characteristics so as to indicate a match therebetween; and
    vi) a transmitter at the receiving station for transmitting information indicative of said match, to at least said mobile communication unit which captured said image.

2. A communication system according to claim 1, wherein said human identification characteristics comprise human eye iris patterns.

3. A communication system according to claim 1, wherein said human identification characteristics comprise human fingerprint patterns.

4. A communication system according to claim 1, further comprising an intermediate station operative to relay signals to and from said transmission means.

5. A communication system according to claim 4, wherein said intermediate station is housed within a motorized vehicle.

6. A communication system according to claim 1, wherein said location specific data comprises a reading from a global positioning system indicating the location of a respective mobile communication unit.

7. A communication system comprising:
    i) a plurality of mobile communication units, said units being configured to obtain image data and transmit said image data to a data receiving station;
    ii) a memory means located at said remote receiving station that is operative to store a plurality of human identification characteristics;
    iii) a comparison means operative to compare received image data with each of said plurality of said human identification characteristics and indicate any match between said received image data and said plurality of said human identification characteristics; and
    iv) a transmitter located at said remote receiving station for transmitting information, indicative of said match, to at least said mobile unit which obtained said image data;

wherein said plurality of mobile communication units each comprise:
a torch said torch having bulb,
a reflector for directing light from said bulb;
a transparent front face, through which said bulb provides illumination;
a camera unit including a camera chip wherein said camera chip is situated between said front face and said bulb; and capable of capturing images through said front face; and
a transmission means connected to said camera chip and configured to transmit images, captured by said camera chip, to a remote recipient.

8. A communication system according to claim 7, further comprising means for indicating a location of the torch.

9. A communication system according to claim 7, wherein each of said plurality of mobile communication units comprises a transmitter capable of transmitting a current position of said unit.

10. A communication system according to claim 9, further comprising satellite position determination means operative to interpret signals to determine a geographical position of said unit.

11. A communication system according to claim 7, further comprising an intermediate station operative to relay signals to and from said transmission means.

12. A communication system according to claim 11, wherein said intermediate station is housed within a motorized vehicle.

13. A communication system according to claim 7, further comprising a viewing screen, operative to view images captured by said camera means.

14. A method of communicating image data obtained by at least one of a plurality of mobile communication units, said mobile communication units comprising a camera means configured to capture an image of a human identification characteristic, a transmission means for transmitting said image data, said image data representing an image of a human identification characteristic, the method comprising the steps of:
capturing said image data via said camera unit;
including with said image data a time and date stamp;
transmitting said image data with the time and date stamp, to a secure remote receiving station;
receiving said image data at the receiving station and stamping the image data with a time and date stamp on receipt at the receiving station;
providing an identification memory at said remote receiving station that is operative to store a plurality of human identification characteristics;
storing a plurality of human identification characteristics in said identification memory;
operating an identification unit to automatically recognize human identification characteristics from said captured image data;
comparing said captured image data comprising said recognized human identification characteristics from said image data with each of said plurality of human identification characteristics stored in said database and indicating a match therebetween;
transmitting from a transmitter at the receiving station, information indicative of a match to at least said mobile unit which obtained said image data, said information indicative of said match is capable of being viewed on the display for displaying an image obtained by the camera means.

15. A method of communicating data according to claim 14, wherein data is communicated via a radio link.

16. A method according to claim 15, wherein said radio link comprises a cellular telephone means operating in co-operation with a cellular telephone network.

17. A method of communicating data obtained by one of a plurality of mobile communication units, said mobile communication unit comprising a camera unit for capturing image data and a transmission means for transmitting said image data, comprising the steps of:
capturing said image data via said camera unit;
transmitting said image data to a receiving station;
storing said image data in a secure memory at the receiving station; and
transmitting information from the receiving station responsive to evaluation of said image data;
providing said mobile communication unit with:
a torch, said torch having bulb;
a reflector for directing light from said bulb;
a transparent front face, through which said bulb provides illumination;
a camera unit including camera chip wherein said camera chip is situated between said front face and said bulb; and capable of capturing images through said front face; and
a transmission means connected to said camera chip and configured to transmit images, captured by said camera chip, to a remote recipient, and wherein said step of capturing said image data comprises taking video or still pictures using said camera unit.

18. A communication system comprising: a camera torch configured to gather data, the camera torch including
said camera torch having bulb;
a reflector for directing light from said bulb;
a transparent front face, through which said bulb provides illumination;
a camera unit including camera chip wherein said camera chip is situated between said front face and said bulb, and capable of capturing images through said front face, and
a transmission means for transmitting gathered data to a receiving station; and a means to relay information from the receiving station.

19. A communication system according to claim 18, further comprising a means is provided to assess the data at the receiving station.

20. A communication system according to claim 18, further comprising a secure memory located at the receiving station.

21. A communication system according to claim 18, further comprising:
identification memory means, operative to store a plurality of human identification characteristics; and
comparison means, operative to compare a captured image with each of said plurality of said human identification characteristics and to indicate any match.

22. A communication system according to claim 21, further comprising identification data reception means, operative to receive human identification characteristics data records and to store said human identification characteristics data records in said identification memory means.

23. A communication system according to claim 22, wherein said human identification characteristic comprises human eye iris patterns.

24. A communication system according to claim 22, wherein said human identification characteristic comprises human fingerprint patterns.

25. A communication system according to claim 18, further comprising means for indicating the location of the torch camera.

26. A communication system according to claim 25, further comprising satellite position determination means, operative to interpret satellite signals to determine the position, on the surface of the earth, of said torch camera, said transmission means being further operative to transmit an indication of said position of said torch camera.

27. A communication system according to claim 18, wherein the torch camera is adapted to transmit a signal indicating its position.

28. A communication system according to claim 18, further comprising an intermediate station operative to relay signals to and from said transmission means.

29. A communication system according to claim 28, wherein said intermediate station is housed within a motorized vehicle.

30. A communication system according to claim 18, further comprising a viewing screen operative to view images captured by said camera means.

31. A communication system comprising:
- a plurality of hand-held mobile communication units, said units comprising a camera configured to capture an image of a human identification characteristic, and a transmission means for transmitting captured image data representing said captured image, with a time and date stamp data, to a remote data receiving station; and a display for displaying an image obtained by the camera;
- a means to receive the captured image data located at the receiving station and to time and date stamp the captured image data on receipt at the receiving station;
- an identification means is operative automatically to recognize human identification characteristics from said captured image data;
- a secure memory located at said remote receiving station that is operative to store a database comprising a plurality of human identification characteristics;
- a comparison means operative to compare the captured image data with each of said plurality of said human identification characteristics stored in said database, and to indicate any match therebetween;
- a transmitter at said remote receiving station for transmitting information, indicative of said match, to at least said mobile communication unit from which said captured image data was obtained and one additional mobile communication unit; and
- a means for indicating location of the mobile communication unit and applying data indicating said location to the transmitted image data, wherein the information indicative of said match is capable of being viewed on the display by at least said mobile communication unit from which said image data was obtained.

* * * * *